US012488134B2

(12) United States Patent
Pasumarthi et al.

(10) Patent No.: US 12,488,134 B2
(45) Date of Patent: Dec. 2, 2025

(54) DATA SECURITY IN LARGE LANGUAGE MODELS

(71) Applicant: SAP SE, Walldorf (DE)

(72) Inventors: Suresh Pasumarthi, Bangalore (IN); Shiva Prasad Nayak, Bangalore (IN)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 18/467,167

(22) Filed: Sep. 14, 2023

(65) Prior Publication Data

US 2025/0094619 A1   Mar. 20, 2025

(51) Int. Cl.
*G06F 21/62* (2013.01)
*G06F 40/295* (2020.01)
*G06F 40/40* (2020.01)

(52) U.S. Cl.
CPC ........ *G06F 21/6227* (2013.01); *G06F 40/295* (2020.01); *G06F 40/40* (2020.01)

(58) Field of Classification Search
None
See application file for complete search history.

(56) References Cited

U.S. PATENT DOCUMENTS

2021/0319897 A1\* 10/2021 Howard ................ G16H 40/20
2021/0406977 A1\* 12/2021 Ramachandran ..... G06F 16/908
2022/0321594 A1\* 10/2022 Formicola ........... H04L 63/1433
2024/0403416 A1\* 12/2024 Sharpe .................. G06F 16/243
2025/0088517 A1\* 3/2025 Davraev ............... H04W 12/12

OTHER PUBLICATIONS

Wikipedia, "Named-entity recognition," https://en.wikipedia.org/wiki/Named-entity_recognition, 7 pages (accessed Jul. 17, 2023).
"spaCy 101: Everything you need to know," https://spacy.io/usage/spacy-101, 35 pages (accessed Aug. 18, 2023).
Oommen, Guiding Large Language Models towards Task-Specific Inference—Prompt Design and Soft Prompts, https://towardsdatascience.com/guiding-a-hugh-language-model-lm-to-perform-specific-tasks-prompt-design-and-soft-prompts-7c45ef4794e4, 17 pages (accessed Aug. 18, 2023).
Wikipedia, "Large language model," https://en.wikipedia.org/wiki/Large_language_model, 18 pages (accessed Aug. 18, 2023).

\* cited by examiner

*Primary Examiner* — Atta Khan
(74) *Attorney, Agent, or Firm* — Klarquist Sparkman, LLP

(57) ABSTRACT

Certain aspects of the disclosure concern a computer-implemented method for improved data security in large language models. The method includes receiving a prompt query entered through a user interface, extracting a plurality of named entities from the prompt query and classifying the plurality of named entities into respective entity classes, tagging the plurality of named entities to be security compliant or security noncompliant based on the respective entity classes, and responsive to finding that one or more named entities are tagged to be security noncompliant, generating an alert on the user interface.

20 Claims, 9 Drawing Sheets

Algorithm 1: customNERModelGenerator
Input: corporateDocumentList
Output: customNERModel
/* Extract ORG, PERSON, GPE, DATE, AGE, PHONENUMBER, EMAILID, SSN and so on */
1 foreach *corporateDocumentList* do
2     namedEntities ← namedEntities ∪ extractNamedEntities(corporateDocument);
3 end
/* Manually tagging named entities via tool */
4 taggedEntities ← manualTagger(namedEntities);
5 foreach *masterTables* do
    /* Auto tagging named entities */
6     taggedEntities ← taggedEntities ∪ extractNamedEntities(masterTable);
7 end
8 customNERModel ← buildCustomNERModel(taggedEntities);

510

Algorithm 2: promptQueryValidator
Input: promptQuery
Input: customNERModel
Output: isQueryValid
1 isQueryValid ← True;
/* Extract ORG, PERSON, GPE, DATE, AGE, PHONENUMBER, EMAILID, SSN and so on */
2 namedEntitiesList ← extractGDPREntities(promptQuery, customNERModel);
3 foreach *namedEntitiesList* do
    /* Check one of the GDPR entity */
4     isQueryValid ← isQueryValid ∨ isGDPREntity(namedEntity);
5 end

The annual corporate sale event for Acme Corporation was scheduled to take place at Indira Nagar, Bangalore. The event was expected to attract over 1,000 attendees, including Acme's top executives, sales representatives, and customers.

The event was designed to promote Acme's latest products and services, and to generate new sales leads. In addition, the event would provide an opportunity for Acme's employees to network with each other and with customers. The event began with a welcome address from Acme's CEO, Mr. John Smith. Mr. Smith (Employee ID: A773976), 32 years old can be contacted via his personal email-id john.smith@gmail.com or with his phone number +91-9767489567 and he resides in Thriuvanmayur, Chennai. He spoke about Acme's recent successes, and he outlined the company's plans for the future.

Following Mr. Smith's address, there was a presentation from Acme's product team. The product team presented the company's latest products and services, and they answered questions from the audience. The event concluded at evening, with a closing reception. During the reception, attendees had the opportunity to mingle with each other and with Acme's executives.

FIG. 6

The annual corporate sale event for Acme Corporation was scheduled to take place at [Indira Nagar LOCATION], [Bangalore LOCATION]. The event was expected to attract over 1,000 attendees, including Acme's top executives, sales representatives, and customers.

The event was designed to promote Acme's latest products and services, and to generate new sales leads. In addition, the event would provide an opportunity for Acme's employees to network with each other and with customers. The event began with a welcome address from Acme's CEO, Mr. [John Smith PERSON]. Mr. [Smith PERSON] (Employee ID: [A77976 EMPLOYEE ID], [32 years old AGE]) can be contacted via his personal email-id [john.smith@email.com EMAIL_ADDRESS] or with his phone number [+91 9767 493567 PHONE NUMBER] and he resides in [Thiruvanmiyur LOCATION], [Chennai LOCATION]. He spoke about Acme's recent successes, and he outlined the company's plans for the future.

Following Mr. [Smith PERSON]'s address, there was a presentation from Acme's product team. The product team presented the company's latest products and services, and they answered questions from the audience. The event concluded at evening, with a closing reception. During the reception, attendees had the opportunity to mingle with each other and with Acme's executives.

DATA SECURITY IN LARGE LANGUAGE MODELS

BACKGROUND

Large language models (LLMs) are the underlying technology that has powered the meteoric rise of generative artificial intelligence (AI) chatbots. Tools like ChatGPT, Google Bard, and Bing Chat all rely on LLMs to generate human-like responses to user prompts and questions. LLMs employ deep learning techniques to understand and mimic language patterns, enabling them to produce coherent and contextually appropriate textual outputs across a wide range of topics and styles. Despite their immense potential, usage of LLMs in an enterprise environment introduces significant data privacy and security risks. When formulating queries, users may unknowingly reveal sensitive details, leading to inadvertent exposure of proprietary data, trade secrets, and/or personal information. The fallout of this can be unauthorized access to confidential data and/or intellectual property, breaches of privacy, and other security risks. The potential for prompting-induced data breaches is compounded by the risk of violating data privacy regulations like European Union's General Data Protection Regulation (GDPR) and California Consumer Privacy Act (CCPA). Thus, improving data security in LLMs is desired.

BRIEF DESCRIPTION OF THE DRAWINGS

FIG. 5 depicts pseudo-code algorithms for generating a custom named entity recognition model and use the same to perform runtime data security check of prompts.

FIG. 6 shows part of an example prompt query entered by a user.

FIG. 7 depicts example results of data security check for the prompt query of FIG. 6.

DETAILED DESCRIPTION

Figure 1:
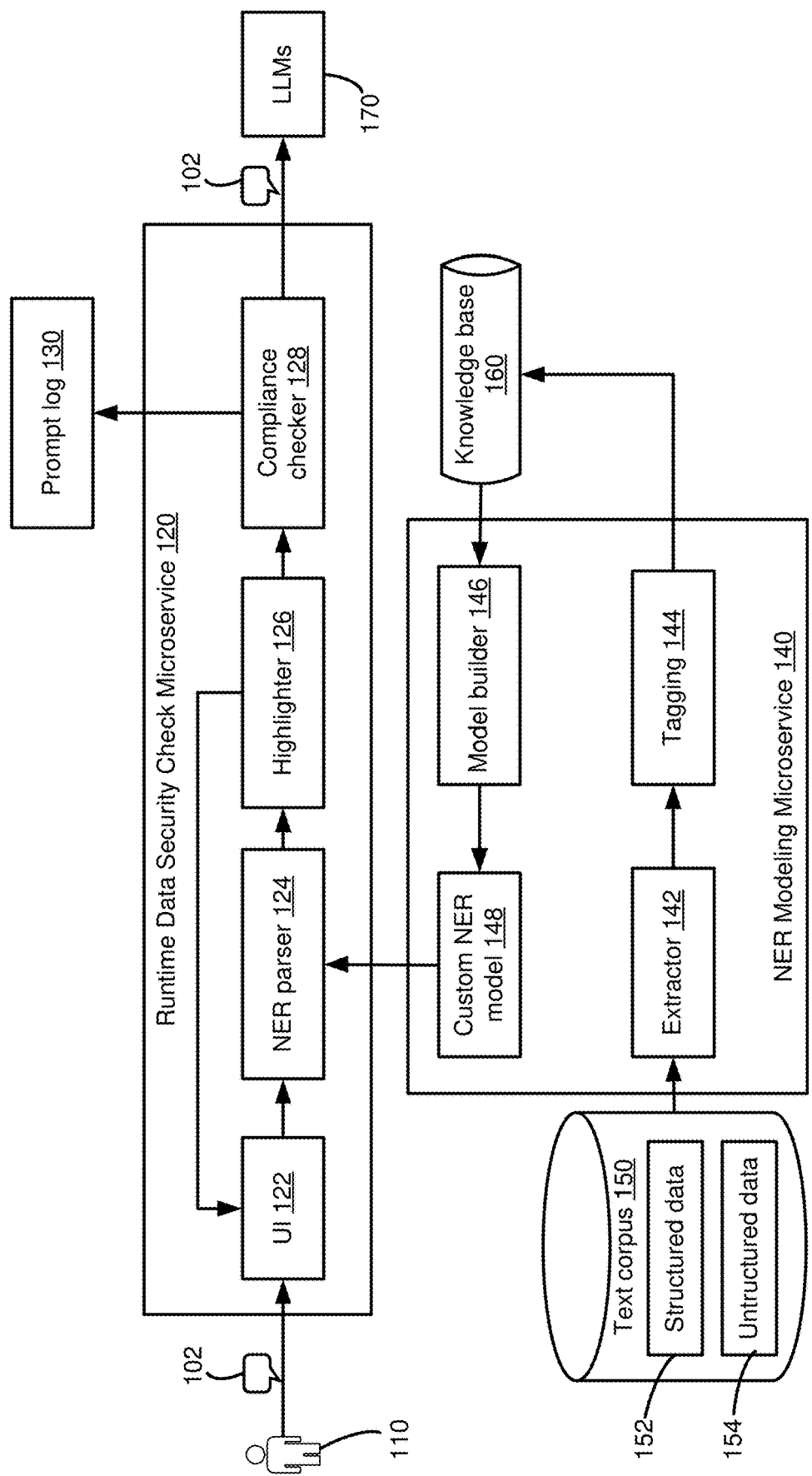
FIG. 1 is an overall block diagram of an example computing system providing improved data security when integrating LLMs into an enterprise environment.

Example 1—Overview of Data Security in LLMs

Generative AI chatbots have become increasingly popular and powerful, thanks to advances in LLMs, which are neural network architectures that can learn and generate natural language from massive amounts of text data. ChatGPT, Google Bard, and Bing Chat are some examples of chatbots that leverage LLMs to produce realistic and diverse responses to user inputs and queries. LLMs use deep learning algorithms to capture and reproduce linguistic patterns, allowing them to generate fluent and relevant textual outputs for various domains and genres.

However, LLMs also pose significant challenges for data privacy and security, especially in an enterprise setting. LLMs are trained on large-scale text corpora, which may contain sensitive information that can be exploited by malicious actors. For instance, a user may unintentionally disclose personal or proprietary information in their chatbot interactions, such as names, addresses, phone numbers, email addresses, credit card numbers, passwords, etc. Such information can be extracted and stored by the LLMs or their providers, leading to potential data breaches, unauthorized access to confidential data and/or intellectual property, privacy violations, identity theft, fraud, and other cyberattacks.

Importantly, LLMs may also infringe data privacy regulations that aim to protect the rights and interests of data subjects and data controllers. For example, the GDPR and CCPA require that data controllers and processors obtain consent from data subjects before collecting, processing, or sharing their personal data. They also grant data subjects the right to access, rectify, erase, restrict, or object to the use of their data. However, LLMs may not comply with these requirements, as they may collect and process personal data without explicit consent or notification and may not provide adequate mechanisms for data subjects to exercise their rights. This can result in legal liabilities and penalties for enterprise users who integrate the LLMs in their computing environments.

The technologies described herein overcome many of the technical challenges described above. Specifically, disclosed herein is a technical solution for detecting and preventing data privacy and security violations in chatbot interactions. The solution can identify and warn users when they enter sensitive information that may be exposed or misused by chatbot providers or other chatbot users. As a result, data security of integrating LLMs in enterprise environment can be improved.

Example 2—Example LLMs and Prompts

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided to LLMs to generate responses. Prompts in LLMs can be initial input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Users often experiment with prompt variations to manipulate output, using techniques like prefixing, temperature control, top-K sampling, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example 3—Example Computing System with Improved Data Security in LLMs

FIG. 1 shows an overall block diagram of an example computing system 100 providing improved data security management for integrating LLMs into an enterprise environment.

In the depicted example, the computing system 100 includes a runtime data security check microservice 120 and a named entity recognition (NER) modeling microservice 140. As described herein, microservices are small, independently deployable, and loosely coupled software applications that perform specific functions within a larger enterprise application. Each microservice can be developed, deployed, and scaled independently, promoting flexibility, modularity, and easier maintenance. The microservices can communicate through pre-defined application programming interfaces (APIs) and can be written in different programming languages, allowing for agile development and efficient system architecture.

As shown in FIG. 1, the runtime data security check microservice 120 can include a user interface (UI) 122, an NER parser 124, a highlighter 126, and a compliance checker 128. The NER modeling microservice 140 can include an extractor 142, a tagging unit 144, a model builder 146, and a custom NER model 148.

The NER modeling microservice 140 can be configured to generate a knowledge base 160 using text data stored in a text corpus 150 and then create the custom NER model 148 based on data in the knowledge base 160. The runtime data security check microservice 120 can be configured to analyze a prompt query 102 entered by a user 110 who intends to submit the prompt query 102 to one or more LLMs 170. Such analysis can determine whether the prompt query 102 entered by the user 110 is compliant with predefined data security protocols (e.g., GDPR and/or CPPA, etc.). The runtime data security check microservice 120 can pass the prompt query 102 to the LLMs if the prompt query 102 is deemed to be security compliant. Otherwise, the runtime data security check microservice 120 may prevent the prompt query 102 from being submitted to the LLMs 170, and the user 110 can be warned of security noncompliance of the prompt query 102. Additionally, any prompt queries 102 submitted to the LLMs 170 can be stored in a prompt log 130. Thus, the runtime data security check microservice 120 can act as a security layer (e.g., to ensure compliance with predefined data privacy and security protocols) between the enterprise environment and external LLMs.

The components shown in FIG. 1 can be configured in different ways. For example, although FIG. 1 depicts the runtime data security check microservice 120 and the NER modeling microservice 140 as two separate microservices, in some implementations, the runtime data security check microservice 120 and the NER modeling microservice 140 can be combined into one integrated microservice. As another example, although the knowledge base 160 depicted in FIG. 1 is external to the NER modeling microservice 140, in some implementations, the knowledge base 160 can be included within the NER modeling microservice 140. In still another example, although FIG. 1 shows the custom NER model 148 as part of the NER modeling microservice 140, in some implementations, the customer NER model 148 can be external to the NER modeling microservice 140.

In practice, the systems shown herein, such as the computing system 100, can vary in complexity, with additional functionality, more complex components, and the like. For example, there can be additional functionality within the runtime data security check microservice 120 and/or the NER modeling microservice 140. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, prompt queries, named entities, entity classes, and the like can be stored in one or more computer-readable storage media or computer-readable storage devices. The technologies described herein can be generic to the specifics of operating systems or hardware and can be applied in any variety of environments to take advantage of the described features.

Example 4—Example Prompt Queries

In any of the examples herein, any variety of text input can be used as prompt queries for submitting to an LLM as described herein. Prompt queries include input instructions or questions (e.g., "Explain the concept of . . . ," "Generate Python code to . . . ," "Summarize the main points of . . . ," etc.) that guide the LLMs to generate text or answers, thus enabling a user to obtain specific outputs or perform tasks by interacting with the LLMs using structured prompts.

In some examples, prompt queries can include input documents, links to documents, and/or excerpts from documents. The term document is intended to cover files, web pages, or other collections of information. For example, a crawler can visit web pages, files can be loaded, or the like.

Example 5—Example Text Corpus

The text corpus 150 can include both structured data 152 (also referred to as structured text corpus) and unstructured data 154 (also referred to as unstructured text corpus).

Structured data 152 refers to organized and formatted text data that follows a predefined pattern. Example structured data 152 includes spreadsheets (with rows and columns of text data) and relational databases (with organized tables with defined fields). For example, an organization can have a structured text database containing master data about customers, suppliers, products, etc.

Unstructured data 154 refers to text data in a non-standardized format, lacking a predefined structure or organized layout (e.g., it does not fit neatly into rows and columns like structured data). Examples of unstructured text data 154 include research papers, API documentations, architecture and design documents, user manuals, developer instructions, programming guides, FAQs, data model documents, emails, support tickets, meeting transcripts, social media posts, etc.

Example 6—Example NER Modeling Microservice

Referring to FIG. 1, the NER modeling microservice 140 can be configured to create the custom NER model 148 based on text data stored in the text corpus 150. An example algorithm 510 (written in pseudo-code) implemented by the NER modeling microservice 140 is depicted in FIG. 5.

Referring back to FIG. 1, the extractor 142 can be configured to extract a plurality of named entities from the text corpus 150, and each extracted named entity can be classified into a predefined category or entity class. A named entity is a specific type of entity in natural language text that has a name and represents a real-world object or concept. Named entities are typically proper nouns and include entities such as names of people, organizations, locations, dates, times, monetary values, etc. For domain-specific applications, specific verb phrases or action words can also be treated as named entities.

For structured data 152, the extractor 142 can extract named entities using a schema which defines organization, format, and relationships of elements within the structured data 152. For example, a relational database can have a schema defining fields or attributes of tables. Thus, text data in a table column can be extracted as named entities, and these extracted named entities can be assigned to an entity class defined by the fields or attributes of the table column. For example, text data in a "COUNTRY" column of a database table can be extracted as named entities assigned to a "COUNTRY" entity class, and text data in a "EMAIL_ADDRESS" column of a database table can be extracted as named entities assigned to an "EMAIL_ADDRESS" entity class.

For unstructured data 154, the extractor 142 can use information retrieval or natural language processing (NLP) techniques to extract named entities and categorize them into predefined entity classes. Specifically, a named entity recognition (NER) tool can be used to identify, and category named entities within the unstructured data 154. NER is a task that aims to identify and categorize named entities within text. One preprocessing step for NER is token extraction, which involves breaking down the text into individual units called tokens. Tokens can be words, punctuation marks, or other meaningful elements. NER algorithms can analyze the tokenized text to identify named entities (which may span multiple tokens) and classify them into predefined entity classes. In some examples, the extractor 142 can include an NLP word tokenizer configured to extract N-gram tokens from the unstructured data 154. N-gram tokens are contiguous sequences of N items (characters, words, or sub-words) taken from a given text, where N represents the number of items in the sequence. In the context of NER, N-gram tokens can help the model capture more context around the named entities, improving the accuracy of entity recognition and classification. In one specific example, N can be set to three. In other examples, N can be less than or more than three.

In one specific example, extraction of named entities from the unstructured data 154 can be performed by using SpaCy, which is an open-source NLP library used for text processing tasks. SpaCy utilizes a pre-trained neural network model to predict entities such as names of persons, organizations, locations, dates, and more. The neural network model has been trained on a massive amount of text data to recognize patterns and context indicative of named entities. Additionally, SpaCy provides a rule-based matcher that allows users to define custom patterns for NER using linguistic rules and regular expressions. In some examples, default SpaCy libraries can be used to extract named entities from the unstructured data 154 and classify them into default entity classes. In other words, the extractor 142 can use a generic (or non-custom) NER tool to extract and classify named entities from the unstructured data 154.

The tagging unit 144 can be configured to tag each entity class generated by the extractor 142 with a flag indicating security compliance or security noncompliance. For named entities extracted from the structured data 152, the tagging can be performed automatically based on predefined rules which specify fields or attributes defined in the schema to be security compliant or noncompliant. For example, according to example predefined rules, the "COUNTRY" entity class corresponding to the "COUNTRY" column of a database table can be automatically tagged with a security compliance flag, whereas the "EMAIL_ADDRESS" entity class corresponding to the "EMAIL_ADDRESS" column of a database table can be automatically tagged with a security noncompliance flag. For named entities extracted from the unstructured data 154, the tagging can be performed manually, at least initially when the entity classes are new (not encountered before). Manual tagging of the entity classes can be performed by a domain expert who is familiar with data privacy and security protocols (e.g., GDPR and/or CPPA, etc.). For example, some entity classes (e.g., PERSON, SUPPLIER, CUSTOMER, etc.) can be manually tagged to be security compliant, whereas some entity classes (e.g., EMAIL_ADDRESS, PHONE_NUMBER, AGE, BIRTH-DATE, CREDIT_CARD_NUMBER, SOCIAL_SECURITY_NUMBER, etc.) can be manually tagged to be security noncompliant. Generally, data that is considered sensitive (e.g., age, sex, gender, medical records, etc.) or personal (e.g., bank account number, credit card information, social security number, etc.) are deemed security noncompliant, whereas data that is publicly available (e.g., organization name, address, phone number, etc.) can be deemed security compliant.

The named entities extracted from the text corpus 150 (either from the structured data 152 or unstructured data 154), their respective entity classes, and the flags tagged to the entity classes can be saved in the knowledge base 160. In some examples, an administrator of the system 100 (e.g., a domain expert) can manually change the entity classes to which the extracted named entities are classified into and/or the tagged flags.

In some examples, tagging of entity classes derived from the unstructured data 154 can be semi-automatic. For example, if an entity class derived from the unstructured data 154 is already stored in the knowledge base 160, that entity class must have been previously tagged and the flag for that entity class is also saved in the knowledge base 160. Thus, there is no need to repeat manual tagging for that entity class. On the other hand, if an entity class derived from the unstructured data 154 is new and not stored in the knowledge base 160, then manual tagging of this new entity class is needed. In other words, tagging of entity classes derived from the unstructured data 154 can be limited to new entity classes that have not been previously saved in the knowledge base 160.

Data saved in the knowledge base 160 can be used by the model builder 146 to generate the custom NER model 148. First, data from the knowledge base can be preprocessed and prepared for model training, e.g., removing irrelevant or redundant data, converting data into a suitable format, etc. Next, a machine learning (ML) algorithm (e.g., decision trees, support vector machines, neural networks, etc.) can be selected and configured. The ML algorithm is then trained on the preprocessed data from the knowledge base, using supervised learning techniques to learn to recognize and classify named entities, and tag the named entities to be security compliant or noncompliant based on the respective entity classes. During training, the algorithm adjusts its internal parameters to minimize the error between its predictions and the true classifications of the named entities in the training data. This process continues until the model reaches a satisfactory level of accuracy or until a predefined stopping criterion is met.

Once training is complete, the resulting custom NER model 148 can be used to automatically extract and classify named entities from new text (e.g., prompt queries 102) and tag the named entities to be security compliant or noncompliant based on the entity classes to which the named entities are classified into. The custom NER model 148 can be further refined and improved by incorporating additional training data later added to the knowledge base 160. Compared to the NER tool used in the extractor 142 which is generic and cannot provide domain specific named entities, the custom NER model 148 is built from the knowledge base 160 which contains domain specific tagged entities-named entities which are extracted from both structured data 152 and unstructured data 154 and tagged with security compliance/noncompliance based on domain-specific knowledge.

Example 7—Example Runtime Data Security Check Microservice

Still referring to FIG. 1, the runtime data security check microservice 120 can use the custom NER model 148 to automatically evaluate whether a prompt query 102 entered by the user 110 poses any data privacy and security risk (e.g., violating GDPR and/or CCPA protocols, etc.) before submitting the prompt query 102 to the LLMs 170. An example algorithm 520 (written in pseudo-code) implemented by the runtime data security check microservice 120 is depicted in FIG. 5.

Referring back to FIG. 1, the user can enter the prompt query 102 through the UI 122. The NER parser 124 can automatically extract, in runtime, named entities from the prompt query 102 using the pre-trained custom NER model 148. As described above, each extracted named entity can be automatically classified, in runtime, into a respective entity class defined by the customer NER model 148. Additionally, each extracted named entity can be automatically tagged, in runtime, to be security compliant or security noncompliant based on the entity class to which the named entity is classified into.

The highlighter 126 can automatically highlight, in runtime, the extracted named entities within the prompt query 102 displayed on the UI 122. The highlighter 126 can use different highlighting properties or visual cues to differentiate named entities that are security compliant from named entities that are security noncompliant. Different visual cues can be created by a variety of means, such as different colors, different fonts (e.g., bold, italics, underlining, etc.), different font styles and/or sizes, different text backgrounds, different text boxes (e.g., different border line width and/or color, etc.), or the combination thereof.

The compliance checker 128 determines if the prompt query 102 poses any data privacy and security risk. If none of the extracted named entities is tagged to be security noncompliant, the prompt query 102 is deemed to be security compliant, and can thus be submitted to the LLMs 170. Meanwhile, the prompt query 102 can be saved in the prompt log 130 for auditing purposes.

On the other hand, if at least one of the extracted named entities is tagged to be security noncompliant, the prompt query 102 is deemed to be security noncompliant. In such circumstances, two different options can be implemented. In a first option, the prompt query 102 that is deemed to be security noncompliant is prohibited from being sent to the LLMs 170. The user 110 can be prompted to change or modify the prompt query 102, e.g., by removing the named entities that are highlighted to be security noncompliant, and then resubmit the modified prompt query 102 for evaluation. In a second option, the user 110 can override the decision of the compliance checker 128. For example, the user can annotate one or more named entities that are tagged to be security noncompliant. In some examples, the user 110 can manually switch the tagging of a named entity, e.g., from security noncompliant to security compliant. In some examples, the user's annotation can provide reasoning for overriding the decision of the compliance checker 128 (e.g., explaining why a specific named entity that is tagged to be security noncompliant should instead be tagged security compliant). Then, the prompt query 102 can be submitted to the LLMs 170, despite that fact that the compliance checker 128 initially determined that the prompt query 102 is security noncompliant. Meanwhile, the prompt query 102, along with the user's annotations, can be stored in the prompt log 130 for auditing purposes. The user's annotations can be used to further improve the custom NER model 148, e.g., by changing the tags of some entity classes.

Example 8—Example Overall Method for Improving Data Security in LLMs

Figure 2:
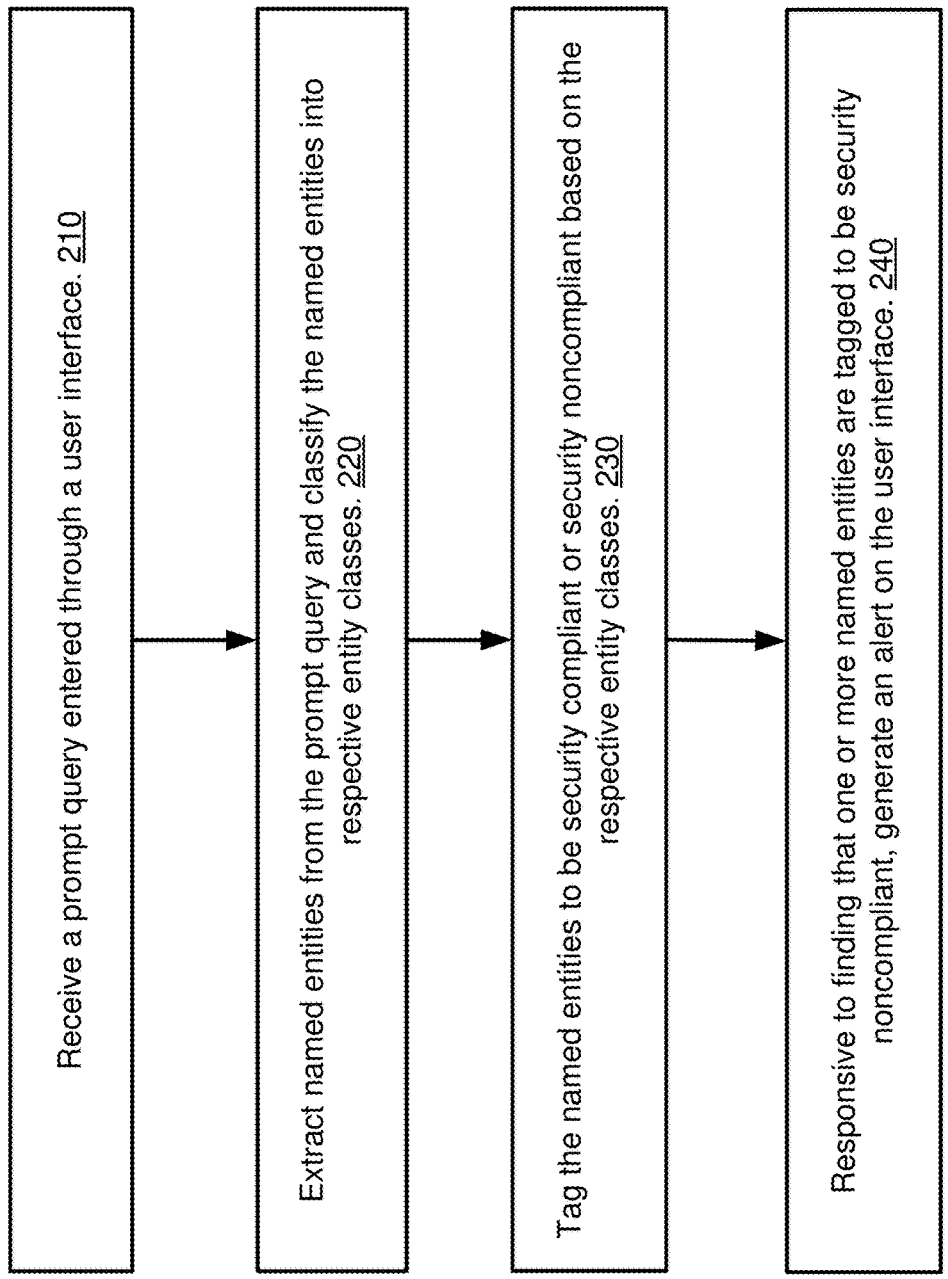
FIG. 2 is a flowchart illustrating an example overall method for improving data security when integrating LLMs into an enterprise environment.

FIG. 2 is a flowchart illustrating an example overall method 200 for improving data security when integrating LLMs into an enterprise environment. The method 200 can be performed, e.g., by the computing system 100 of FIG. 1.

At step 210, a prompt query intended to be sent to an LLM is entered through a user interface (e.g., the user interface 122). The received prompt query can be displayed on the user interface.

At step 220, a plurality of named entities can be automatically extracted, in runtime, from the prompt query, and each extracted named entity can be automatically classified, in runtime, a corresponding entity class. As described above, extraction and classification of named entities can be performed by a parser (e.g., the NER parser 124) using a pre-trained NER model (e.g., the custom NER model 148).

At step 230, each of the extracted named entities can be automatically tagged, in runtime, to be security compliant or security noncompliant based on the entity class to which the named entity is classified into. As described above, such tagging can also be performed by the NER parser using the pre-trained custom NER model.

In some examples, the plurality of named entities extracted from the prompt query can be highlighted (e.g., by the highlighter 126), in runtime, on the user interface. Such highlighting can be configured to visually distinguish (e.g., using different visual cues) security compliant named entities from security noncompliant named entities.

Then at 240, responsive to finding (e.g., by the compliance checker 128) that one or more named entities are tagged to be security noncompliant, an alert can be generated on the user interface, prompting the user to revise or remove words that are found to be security noncompliant named entities. In such circumstances, the prompt query can be prevented from sending to the LLM. Alternatively, the user may ignore the alert and force the prompt query to be sent to the LLM, as described above. On the other hand, if all named entities are tagged to be security compliant, the prompt query can be submitted to the LLM. Anytime a prompt query is sent to the LLM, the prompt query can be logged (e.g., in the prompt log 130) for auditing purposes.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example 9—Example Process of Generating Custom NER Model

Figure 3:
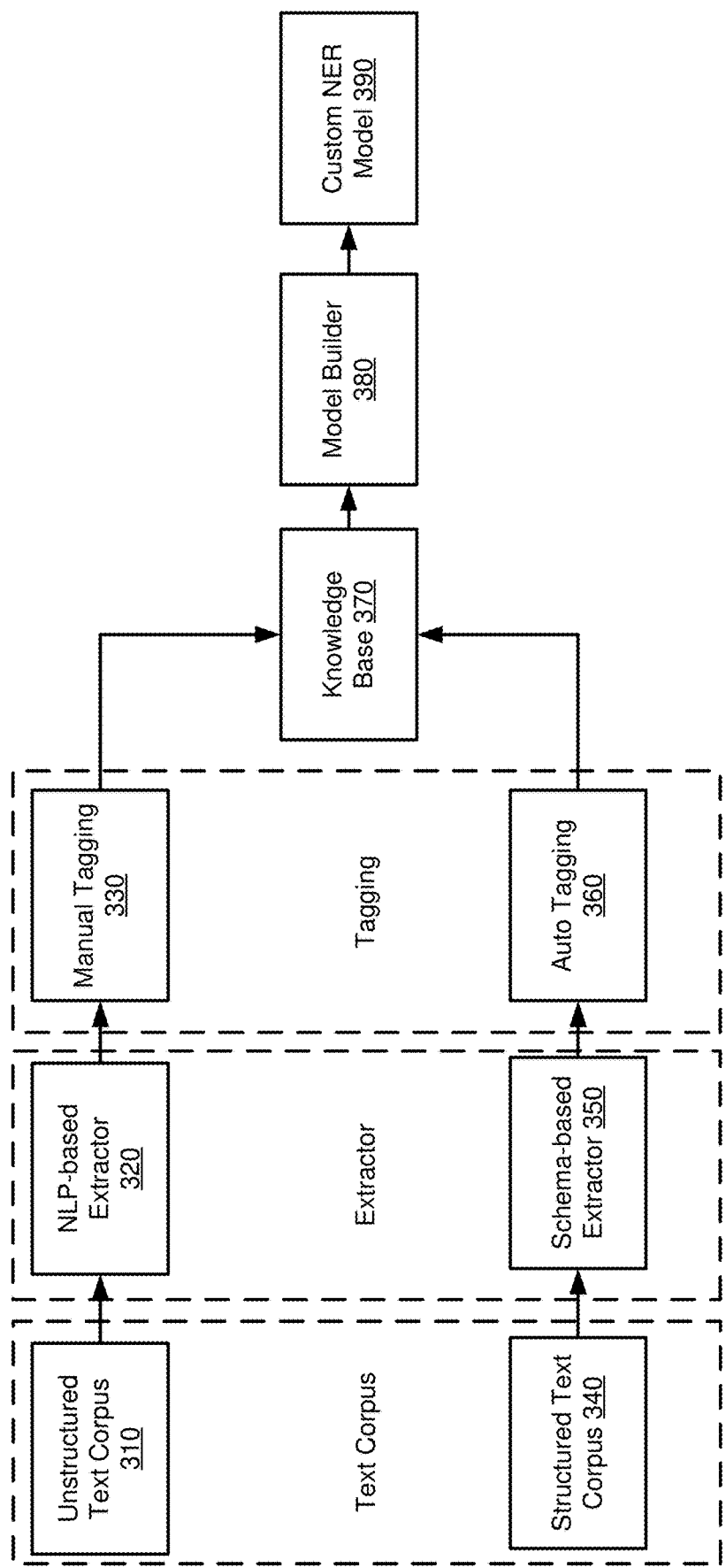
FIG. 3 is an example flow diagram illustrating a process for creating a custom named entity recognition model used for improving data security in LLMs.

FIG. 3 is an example flow diagram illustrating a process 300 for creating a custom NER model which can be used for runtime data security check of prompt queries intended to be sent to input of LLMs.

Two different data sources are shown in the depicted example: an unstructured text corpus 310 and a structured text corpus 340, the combination of which can form a text corpus similar to the text corpus 150 of FIG. 1.

An NLP-based extractor 320 can be used to extract named entities from the unstructured text corpus 310 and classify the named entities to respective entity classes. As described above, the NLP-based extractor 320 can use a generic NLP word tokenizer to extract and classify named entities. A schema-based extractor 350 can be used to extract and classify named entities from the structured text corpus 340 and classify the named entities to respective entity classes. As described above, the schema-based extractor 350 can use a schema which defines fields or attributes of the structured data 152 to extract and classify named entities. The NLP-based extractor 320 and the schema-based extractor 350, collectively, can be referred to as an extractor, similar to the extractor 142 of FIG. 1.

Extraction of the named entities (either from the unstructured text corpus 310 or the structured text corpus 340) can be performed periodically according to a predefined schedule (e.g., every week, every month, etc.) or can be performed on-demand (e.g., when a sufficient amount of new text data is added to the respective text corpus). In some examples, extraction of named entities can be limited to text data that has been newly added to the respective text corpus since previous extraction of the named entity from that text corpus. In other words, previously analyzed text data in the text corpus does not need to be reanalyzed, and only newly added (or delta) text data is subject to analysis. As a result, the efficiency of named entity extraction can be improved and the corresponding demand of computing resources (e.g., memory, CPU usage, etc.) can be reduced (compared to analyzing all text data in the text corpus). In some examples, retraining or updating of the custom NER model 390 can also be performed periodically (e.g., based on a predefined schedule) or on-demand (e.g., when a sufficient amount of new data is added to the knowledge base 370).

A manual tagging tool 330 can be used to tag entity classes generated by the NLP-based extractor 320 with flags indicating security compliance or noncompliance. As described above, not every entity class generated by the NLP-based extractor 320 need to be manually tagged (e.g., previously tagged entity classes can be skipped). An automatic tagging tool 360 can be used to tag entity classes generated by the schema-based extractor 350 with flags indicating security compliance or noncompliance. As described above, predefined rules can be used for automatic tagging of entity classes generated by the schema-based extractor 350. The manual tagging tool 330 and the automatic tagging tool 360, collectively, can be referred to as a tagging unit, similar to the tagging unit 144 of FIG. 1.

The named entities (extracted from both the unstructured text corpus 310 and the structured text corpus 340), their classified entity classes, and the corresponding tags, can be stored in a knowledge base 370 (like the knowledge base 160). As described above, a model builder 380 (like the model builder 146) can use the data stored in the knowledge base 370 to create a custom NER model 390 (similar to the custom NER model 148).

Example 10—Example Process of Runtime Data Security Check

Figure 4:
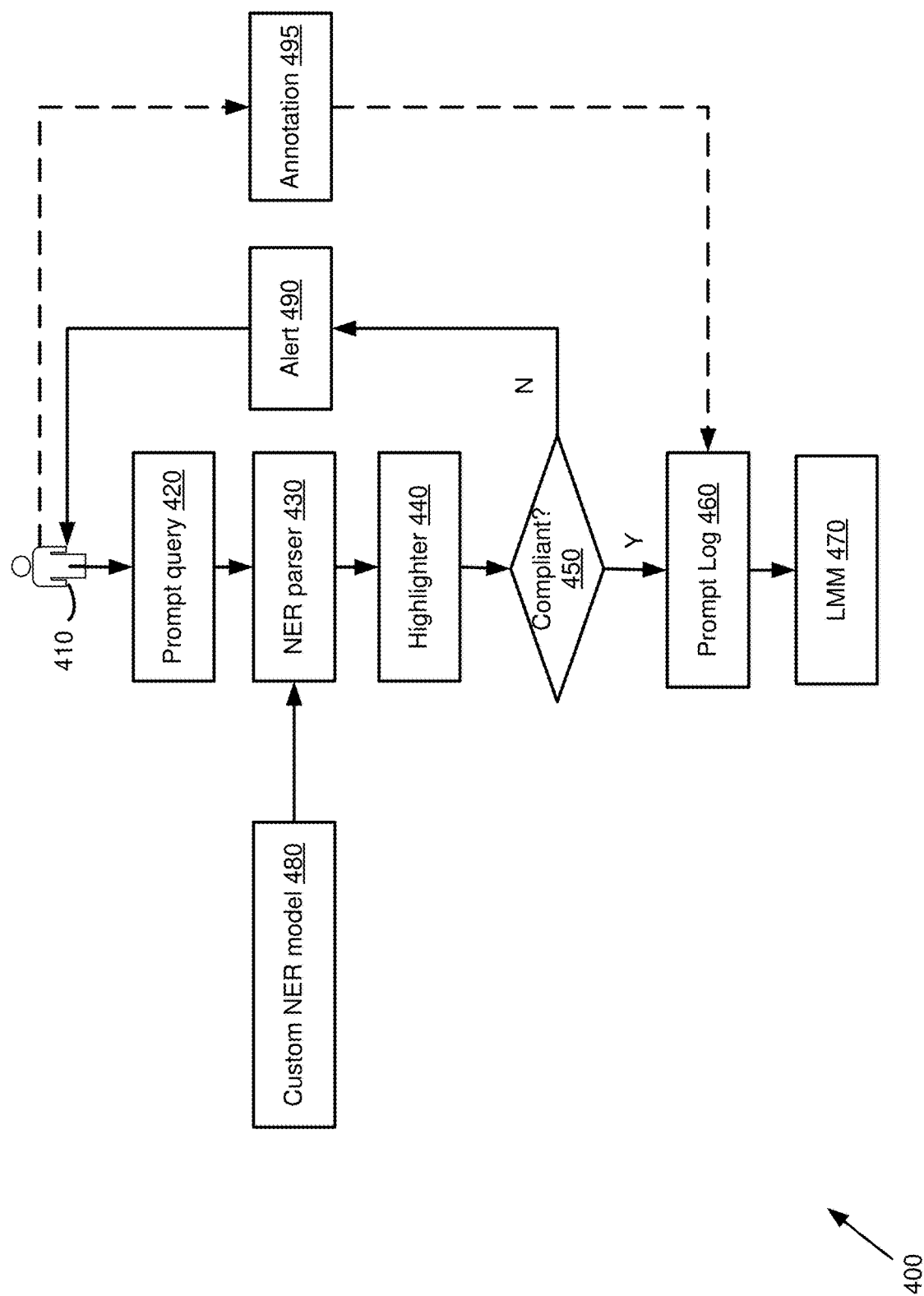
FIG. 4 is an example flow diagram illustrating a process for performing runtime data security check of prompts entered for LLMs.

FIG. 4 is an example flow diagram illustrating a process 400 for performing runtime data security check of prompt queries intended to be sent to input of LLMs.

A user 410 can enter a prompt query 420 via a user interface (e.g., the user interface 122). Upon receiving the prompt query 420, an NER parser 430 (similar to the NER parser 124) can extract and classify, in runtime, a plurality of named entities from the prompt query 420. Each extracted named entity can also be automatically tagged, in runtime, to be security compliant or security noncompliant. The NER parser 430 can perform real-time extraction, classification, and tagging of the named entities based on a custom NER model 480 (like the custom NER model 148) which has been pre-trained based on a text corpus, as described above. Next, a highlighter 440 (like the highlighter 126) can highlight the named entities extracted from the prompt query 420 on the user interface. Different highlighting can be used to distinguish security compliant named entities from security noncompliant named entities. Then, a condition check can be performed at 450. If all extracted named entities are security compliant, the prompt query 420 can be stored in a prompt log 460 (like the prompt log 130) and then submitted as an input to the LLM 470. On the other hand, if at least one of the extracted named entities is security noncompliant, an alert 490 can be generated and fed back to the user 410. The alert 490 can notify the user 410 that the prompt query 420 cannot be submitted to the LLM for potential violation and data privacy and security protocols, and recommend removing the security noncompliant named entities from the prompt query 420. In some implementations, the user 410 can choose to ignore the alert 490. For example, the user 410 can provide annotations 495 (e.g., manually change the tags of some named entities from security noncompliant to security compliant) through the user interface. Then, the prompt query 420 can be saved in the prompt log 460 (along with the user's annotations) and submitted to the LLM 470.

Example 11—Example Use Case

A use case is shown in FIGS. 6-7 to further illustrate the disclosed technologies. FIG. 6 shows part of an example prompt query 600 entered by a user (e.g., the user may want to submit the prompt query 600 to an LLM for generating a summary or a report based on the text content contained therein). FIG. 7 shows the results 700 of runtime data security check for the prompt query 600 (e.g., the results 700 can be obtained by analyzing the prompt query 600 using the runtime data security check microservice 120).

In the depicted example, the following named entities, their corresponding entity classes, and the security complaint/noncompliant tags are derived from the prompt query 600:

| Named entity | Entity class | Tag |
|---|---|---|
| Indira Nagar | LOCATION | Security Compliant |
| Bangalore | LOCATION | Security Compliant |
| John Smith | PERSON | Security Compliant |
| Smith | PERSON | Security Compliant |
| A773976 | EMPLOYEE_ID | Security Noncompliant |
| 32 years old | AGE | Security Noncompliant |
| john.smith@gmail.com | EMAIL_ADDRESS | Security Noncompliant |
| +91-9767489567 | PHONE_NUMBER | Security Noncompliant |
| Thriuvanmayur | LOCATION | Security Compliant |
| Chennai | LOCATION | Security Compliant |
| Smith | PERSON | Security Compliant |

As shown in FIG. 7, all extracted named entities are highlighted (e.g., with grey text background) and their corresponding entity classes are displayed next to the respective named entities. In this example, the security noncompliant named entities are further bounded within rectangular text boxes so that they are visually distinguished from the security compliant named entities. In some implementations, the user can right click a named entity to manually change the tagging result of a named entity (e.g., switching from security noncompliant to security compliant) and add annotations (e.g., providing reasons for the change).

Example 12—Example Advantages

A number of advantages can be achieved via the technologies described herein.

Specifically, the technologies described herein provides a security layer between an enterprise environment and external LLM computing systems. Any user input generated within the enterprise environment must be examined by the security layer before being sent to the external LLM computing systems, and the security layer can detect and prevent data privacy and security violations in chatbot interactions. As a result, data security of integrating LLMs in enterprise environment can be improved.

The technologies described herein also provides an intuitive and flexible user interface for users interacting with chatbots. Security noncompliant text within a user's prompt query can be distinctively highlighted, and instant feedback can be provided to the user, guiding the user to revise the prompt query. Optionally, the user can annotate and/or override compliance check results, which can be used to improve the custom NER model.

Further, the runtime data security check and NER modeling disclosed herein are implemented as microservices, which offer technical advantages of improved modularity, scalability, and resilience. The microservices enable independent development, deployment, and maintenance of small, focused components, enhancing agility and facilitating updates. For example, the NER modeling microservice disclosed herein allows the custom NER model to be continuously updated and improved based on incremental data available in the text corpus, thereby reflecting dynamically changing enterprise environment and/or the data privacy and security protocols.

Example 13—Example Computing Systems

Figure 8:
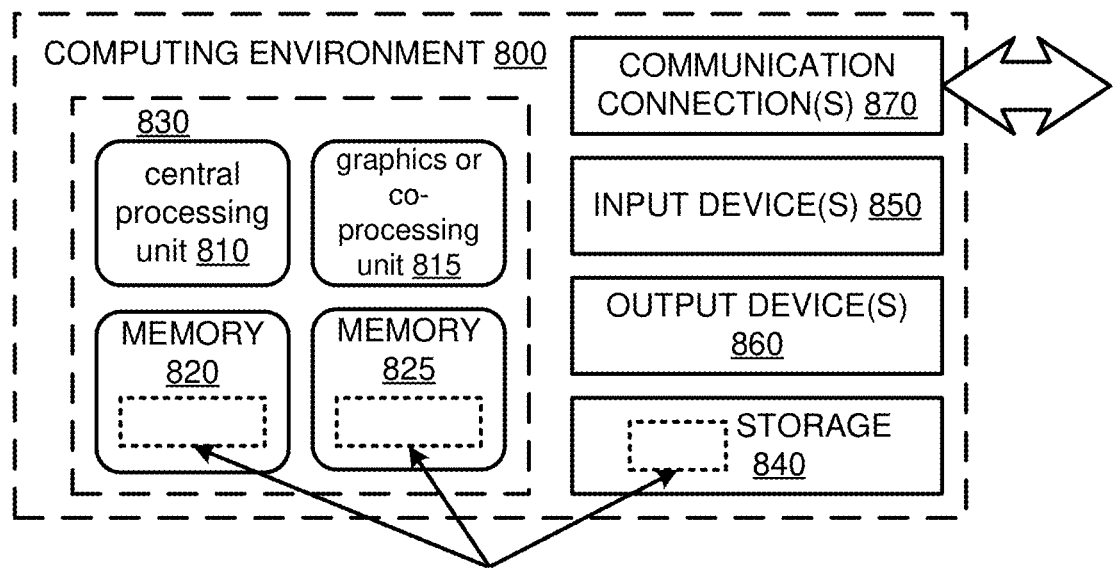
FIG. 8 is a block diagram of an example computing system in which described embodiments can be implemented.

FIG. 8 depicts an example of a suitable computing system 800 in which the described innovations can be implemented.

The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 can store software 880 implementing one or more innovations described herein, in the form of computer-executable instructions suitable for execution by the processing unit(s) 810, 815.

A computing system 800 can have additional features. For example, the computing system 800 can include storage 840, one or more input devices 850, one or more output devices 860, and one or more communication connections 870, including input devices, output devices, and communication connections for interacting with a user. An interconnection mechanism (not shown) such as a bus, controller, or network can interconnect the components of the computing system 800. Typically, operating system software (not shown) can provide an operating environment for other software executing in the computing system 800, and coordinate activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 can store instructions for the software implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 14—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 15—Example Cloud Computing Environment

Figure 9:
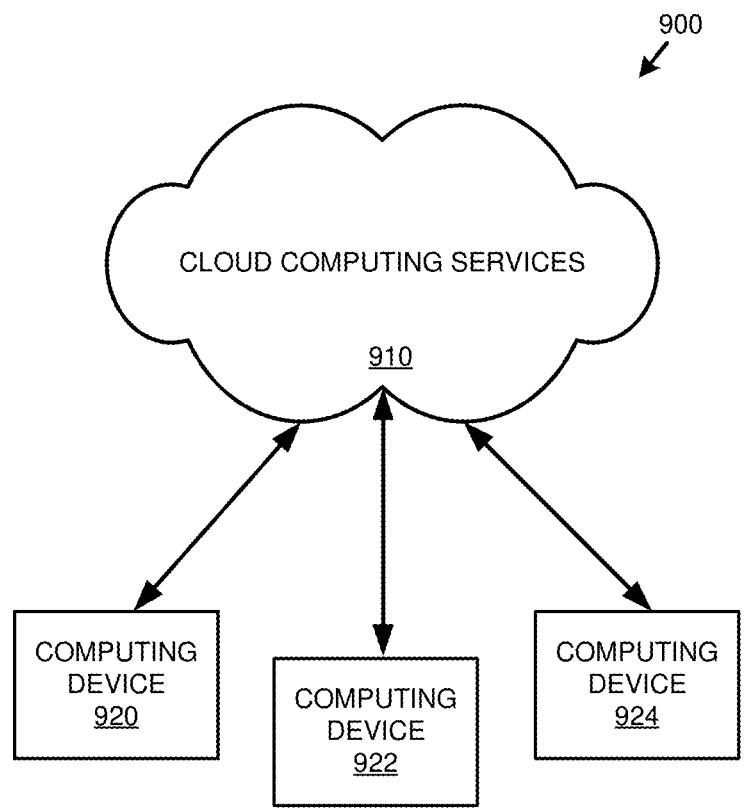
FIG. 9 is a block diagram of an example cloud computing environment that can be used in conjunction with the technologies described herein.

FIG. 9 depicts an example cloud computing environment 900 in which the described technologies can be implemented, including, e.g., the system 100 and other systems herein. The cloud computing environment 900 can include cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 can be utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 16—Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example 17—Example Embodiments

Any of the following example clauses can be implemented.

Clause 1. A computer-implemented method for improved data security in large language models, the method comprising: receiving a prompt query entered through a user interface; extracting, in runtime, a plurality of named entities from the prompt query and classifying the plurality of named entities into respective entity classes; tagging, in runtime, the plurality of named entities to be security compliant or security noncompliant based on the respective entity classes; and responsive to finding that one or more named entities are tagged to be security noncompliant, generating an alert on the user interface.

Clause 2. The method of clause 1, further comprising highlighting, in runtime, on the user interface the plurality of named entities extracted from the prompt query.

Clause 3. The method of clause 2, wherein the highlighting comprises generating a first visual cue for one or more named entities that are tagged to be security noncompliant and generating a second visual cue for remaining named entities that are tagged to be security compliant, the second visual cue being different from the first visual cue.

Clause 4. The method of any one of clauses 1-3, further comprising: responsive to finding that none of the named entities is tagged to security noncompliant, submitting the prompt query to one or more large language models; and storing the prompt query in a prompt log.

Clause 5. The method of any one of clauses 1-4, further comprising: receiving annotations for the one or more named entities that are tagged to be security noncompliant; submitting the prompt query to one or more large language models; and storing the prompt query and the annotations in a prompt log.

Clause 6. The method of any one of clauses 1-5, further comprising training a named entity recognition model using an annotated knowledge base, wherein extracting the plurality of named entities from the prompt query and classifying the plurality of named entities into respective entity classes are based on the named entity recognition model.

Clause 7. The method of clause 6, further comprising: extracting named entities from a text corpus; classifying the named entities extracted from the text corpus into respective entity classes; tagging the entity classes with flags indicating security compliance or security noncompliance; and saving the named entities extracted from the text corpus, their respective entity classes, and the flags in the annotated knowledge base.

Clause 8. The method of clause 7, wherein extracting the named entities from the text corpus is performed periodically according to a predefined schedule, wherein extraction of the named entities is limited to text data that has been newly added to the text corpus since previous extraction of the named entity from the text corpus.

Clause 9. The method of clause 7, wherein extracting the named entities from the text corpus is performed on-demand, wherein extraction of the named entities is limited to text data that has been newly added to the text corpus since previous extraction of the named entity from the text corpus.

Clause 10. The method of any one of clauses 7-9, wherein tagging the entity classes is limited to new entity classes that have not been previously saved in the annotated knowledge base.

Clause 11. A computing system for improved data security in large language models, the system comprising: memory; receiving a prompt query entered through a user interface; extracting, in runtime, a plurality of named entities from the prompt query and classifying the plurality of named entities into respective entity classes; tagging, in runtime, the plurality of named entities to be security compliant or security noncompliant based on the respective entity classes; and responsive to finding that one or more named entities are tagged to be security noncompliant, generating an alert on the user interface.

Clause 12. The system of clause 11, wherein the operations further comprise highlighting, in runtime, on the user interface the plurality of named entities extracted from the prompt query.

Clause 13. The system of clause 12, the highlighting comprises generating a first visual cue for one or more named entities that are tagged to be security noncompliant and generating a second visual cue for remaining named entities that are tagged to be security compliant, the second visual cue being different from the first visual cue.

Clause 14. The system of any one of clauses 11-13, wherein the operations further comprise: responsive to finding that none of the named entities is tagged to security noncompliant, submitting the prompt query to one or more large language models; and storing the prompt query in a prompt log.

Clause 15. The system of any one of clauses 11-14, wherein the operations further comprise: receiving annotations for the one or more named entities that are tagged to be security noncompliant; submitting the prompt query to one or more large language models; and storing the prompt query and the annotations in a prompt log.

Clause 16. The system of any one of clauses 11-15, wherein the operations further comprise comprising training a named entity recognition model using an annotated knowledge base, wherein extracting the plurality of named entities from the prompt query and classifying the plurality of named entities into respective entity classes are based on the named entity recognition model.

Clause 17. The system of clause 16, wherein the operations further comprise: extracting named entities from a text corpus; classifying the named entities extracted from the text corpus into respective entity classes; tagging the entity classes with flags indicating security compliance or security noncompliance; and saving the named entities extracted from the text corpus, their respective entity classes, and the flags in the annotated knowledge base.

Clause 18. The system of clause 17, wherein extracting the named entities from the text corpus is performed periodically according to a predefined schedule, wherein extraction of the named entities is limited to text data that has been newly added to the text corpus since previous extraction of the named entity from the text corpus.

Clause 19. The system of clause 17, wherein extracting the named entities from the text corpus is performed on-demand, wherein extraction of the named entities is limited to text data that has been newly added to the text corpus since previous extraction of the named entity from the text corpus.

Clause 20. One or more non-transitory computer-readable media having encoded thereon computer-executable instructions causing one or more processors to perform a method for improved data security in large language models, the method comprising: receiving a prompt query entered through a user interface; extracting, in runtime, a plurality of named entities from the prompt query and classifying the plurality of named entities into respective entity classes; highlighting, in runtime, on the user interface the plurality of named entities extracted from the prompt query; tagging, in runtime, the plurality of named entities to be security compliant or security noncompliant based on the respective entity classes; and responsive to finding that one or more named entities are tagged to be security noncompliant, generating an alert on the user interface, wherein the highlighting comprises generating a first visual cue for one or more named entities that are tagged to be security noncompliant and generating a second visual cue for remaining named entities that are tagged to be security compliant, the second visual cue being different from the first visual cue.

Example 18—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:
1. A computer-implemented method for improved data security in large language models, the method comprising:
  receiving a prompt query entered through a user interface of a runtime data security check microservice;
  extracting, in runtime, using a pre-trained custom named entity recognition (NER) model generated from a domain-specific annotated knowledge base, a plurality of named entities from the prompt query and classifying the plurality of named entities into respective entity classes;
  tagging, in runtime, by the runtime data security check microservice, the plurality of named entities to be security compliant or security noncompliant based on the respective entity classes;

determining, in runtime, by the runtime data security check microservice, whether to allow submission of the prompt query to a large language model based on the tagging of the named entities, comprising:
responsive to finding that none of the named entities is tagged to be security noncompliant, submitting the prompt query to the large language model; and
responsive to finding that one or more named entities are tagged to be security noncompliant, generating, in runtime, an alert on the user interface, and rejecting submission of the prompt query to the large language model, or enabling a user to override the tagging of one or more named entities and submit the prompt query to the large language model,
wherein the annotated knowledge base is generated by applying a generic NER tool to extract a first set of named entities from unstructured data included in a text corpus, classifying the first set of named entities into a first set of entity classes, and tagging the first set of entity classes with corresponding security compliance or noncompliance attributes.

2. The method of claim 1, further comprising highlighting, in runtime, on the user interface the plurality of named entities extracted from the prompt query.

3. The method of claim 2, wherein the highlighting comprises generating a first visual cue for one or more named entities that are tagged to be security noncompliant and generating a second visual cue for remaining named entities that are tagged to be security compliant, the second visual cue being different from the first visual cue.

4. The method of claim 1, further comprising:
responsive to finding that none of the named entities is tagged to security noncompliant,
storing the prompt query in a prompt log.

5. The method of claim 1, further comprising:
receiving annotations for the one or more named entities that are tagged to be security noncompliant; and
storing the prompt query and the annotations in a prompt log.

6. The method of claim 1, further comprising training the custom NER model using the domain-specific annotated knowledge base.

7. The method of claim 6, wherein training the custom NER model comprises:
extracting a second set of named entities from structured data included in the text corpus based on a schema defining fields or attributes of the structured data;
classifying the second set of named entities into a second set of entity classes based on the schema;
tagging the second set of entity classes with flags indicating security compliance or security noncompliance; and
saving the second set of named entities, the second set of entity classes, and the flags in the domain-specific annotated knowledge base.

8. The method of claim 7, wherein extracting the first set of named entities from unstructured data and the second set of named entities from structured data is performed periodically according to a predefined schedule, wherein each extraction is limited to text data that has been newly added to the text corpus since a previous extraction of named entities from the text corpus.

9. The method of claim 7, wherein extracting the first set of named entities from unstructured data and the second set of named entities from structured data is performed on-demand, wherein each extraction is limited to text data that has been newly added to the text corpus since a previous extraction of named entities from the text corpus.

10. The method of claim 7, wherein tagging the first set of entity classes and the second set of entity classes is limited to entity classes that have not been previously saved in the domain-specific annotated knowledge base.

11. A computing system for improved data security in large language models, the system comprising:
memory;
one or more hardware processors coupled to the memory; and
one or more computer readable storage media storing instructions that, when loaded into the memory, cause the one or more hardware processors to perform operations comprising:
receiving a prompt query entered through a user interface of a runtime data security check microservice;
extracting, in runtime, using a pre-trained custom named entity recognition (NER) model generated from a domain-specific annotated knowledge base, a plurality of named entities from the prompt query and classifying the plurality of named entities into respective entity classes;
tagging, in runtime, by the runtime data security check microservice, the plurality of named entities to be security compliant or security noncompliant based on the respective entity classes;
determining, in runtime, by the runtime data security check microservice, whether to allow submission of the prompt query to a large language model based on the tagging of the named entities, comprising:
responsive to finding that none of the named entities is tagged to be security noncompliant, submitting the prompt query to the large language model; and
responsive to finding that one or more named entities are tagged to be security noncompliant, generating, in runtime, an alert on the user interface, and rejecting submission of the prompt query to the large language model, or enabling a user to override the tagging of one or more named entities and submit the prompt query to the large language model,
wherein the annotated knowledge base is generated by applying a generic NER tool to extract a first set of named entities from unstructured data included in a text corpus, classifying the first set of named entities into a first set of entity classes, and tagging the first set of entity classes with corresponding security compliance or noncompliance attributes.

12. The system of claim 11, wherein the operations further comprise highlighting, in runtime, on the user interface the plurality of named entities extracted from the prompt query.

13. The system of claim 12, wherein the highlighting comprises generating a first visual cue for one or more named entities that are tagged to be security noncompliant and generating a second visual cue for remaining named entities that are tagged to be security compliant, the second visual cue being different from the first visual cue.

14. The system of claim 11, wherein the operations further comprise:
responsive to finding that none of the named entities is tagged to security noncompliant,
storing the prompt query in a prompt log.

15. The system of claim 11, wherein the operations further comprise:
receiving annotations for the one or more named entities that are tagged to be security noncompliant;

and
storing the prompt query and the annotations in a prompt log.

16. The system of claim 11, wherein the operations further comprise training the custom NER model using the domain-specific annotated knowledge base.

17. The system of claim 16, wherein training the custom NER model comprises:
   extracting a second set of named entities from structured data included in the text corpus based on a schema defining fields or attributes of the structured data;
   classifying the second set of named entities into a second set of entity classes based on the schema;
   tagging the second set of entity classes with flags indicating security compliance or security noncompliance; and
   saving the second set of named entities, the second set of entity classes, and the flags in the domain-specific annotated knowledge base.

18. The system of claim 17, wherein extracting the first set of named entities from unstructured data and the second set of named entities from structured data is performed periodically according to a predefined schedule, wherein each extraction is limited to text data that has been newly added to the text corpus since a previous extraction of named entities from the text corpus.

19. The system of claim 17, wherein extracting the first set of named entities from unstructured data and the second set of named entities from structured data is performed on-demand, wherein each extraction is limited to text data that has been newly added to the text corpus since a previous extraction of named entities from the text corpus.

20. One or more non-transitory computer-readable media having encoded thereon computer-executable instructions causing one or more processors to perform a method for improved data security in large language models, the method comprising:
   receiving a prompt query entered through a user interface of a runtime data security check microservice;
   extracting, in runtime, using a pre-trained custom named entity recognition (NER) model generated from a domain-specific annotated knowledge base, a plurality of named entities from the prompt query and classifying the plurality of named entities into respective entity classes;
   highlighting, in runtime, on the user interface the plurality of named entities extracted from the prompt query;
   tagging, in runtime, by the runtime data security check microservice, the plurality of named entities to be security compliant or security noncompliant based on the respective entity classes;
   determining, in runtime, by the runtime data security check microservice, whether to allow submission of the prompt query to a large language model based on the tagging of the named entities, comprising:
      responsive to finding that none of the named entities is tagged to be security noncompliant, submitting the prompt query to the large language model; and
      responsive to finding that one or more named entities are tagged to be security noncompliant, generating, in runtime, an alert on the user interface, and rejecting submission of the prompt query to the large language model, or enabling a user to override the tagging of one or more named entities and submit the prompt query to the large language model,
   wherein the annotated knowledge base is generated by applying a generic NER tool to extract a first set of named entities from unstructured data included in a text corpus, classifying the first set of named entities into a first set of entity classes, and tagging the first set of entity classes with corresponding security compliance or noncompliance attributes,
   wherein the highlighting comprises generating a first visual cue for one or more named entities that are tagged to be security noncompliant and generating a second visual cue for remaining named entities that are tagged to be security compliant, the second visual cue being different from the first visual cue.

* * * * *